(12) United States Patent
Lin et al.

(10) Patent No.: US 10,498,594 B2
(45) Date of Patent: Dec. 3, 2019

(54) COMPATIBILITY CONFIGURATION METHOD AND SYSTEM FOR INTERNET OF THINGS DEVICE

(71) Applicant: Espressif Systems (Shanghai) Co., Ltd., Shanghai (CN)

(72) Inventors: Hao Lin, Shanghai (CN); Rui Zhan, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 85 days.

(21) Appl. No.: 15/574,313

(22) PCT Filed: Jul. 8, 2015

(86) PCT No.: PCT/CN2015/083611
§ 371 (c)(1),
(2) Date: Nov. 15, 2017

(87) PCT Pub. No.: WO2016/183914
PCT Pub. Date: Nov. 24, 2016

(65) Prior Publication Data
US 2018/0139088 A1 May 17, 2018

(30) Foreign Application Priority Data
May 18, 2015 (CN) .......................... 2015 1 0253252

(51) Int. Cl.
*H04L 12/24* (2006.01)
*H04L 29/06* (2006.01)
(Continued)

(52) U.S. Cl.
CPC ...... *H04L 41/0803* (2013.01); *H04L 41/0873* (2013.01); *H04L 69/22* (2013.01);
(Continued)

(58) Field of Classification Search
CPC ..... H04L 41/0803; H04L 69/22; H04L 69/28; H04L 41/0873; H04L 43/16;
(Continued)

(56) References Cited

U.S. PATENT DOCUMENTS

2005/0180381 A1* 8/2005 Retzer ................... H04J 3/1682
370/349
2017/0171862 A1* 6/2017 Matsuo ................. H04W 84/12
(Continued)

FOREIGN PATENT DOCUMENTS

| CN | 102187612 A | 9/2011 |
|---|---|---|
| CN | 103888908 A | 6/2014 |

(Continued)

*Primary Examiner* — Paul H Masur
*Assistant Examiner* — Michael K Phillips
(74) *Attorney, Agent, or Firm* — Reinhart Boerner Van Deuren P.C.

(57) ABSTRACT

A compatible configuration method for an IoT device, wherein, by adding an energy detection device and a length verification device having a timer to a digital baseband demodulation portion of a Wi-Fi IoT device, when the Wi-Fi IoT device detects an HT-SIG field or VHT-SIG-B field in a header of a configuration information packet from a master device, starting the timer and the energy detection device, so as to judge whether receipt is successful based on whether a recorded time length when channel energy reaches a lower limit conforms to length information in the HT-SIG field or VHT-SIG-B field in the header of a configuration information packet for a higher frequency band mode; and after successful receipt, obtaining transmitted configuration access information sections by computing length differences between received configuration information packets, and then combining the received information sections to obtain configuration access information.

16 Claims, 2 Drawing Sheets

(51) Int. Cl.
*H04W 48/16* (2009.01)
*H04W 8/22* (2009.01)
*H04W 84/12* (2009.01)

(52) U.S. Cl.
CPC ............ *H04L 69/28* (2013.01); *H04W 48/16*
(2013.01); *H04W 8/22* (2013.01); *H04W 84/12*
(2013.01)

(58) Field of Classification Search
CPC .... H04L 29/0653; H04W 48/16; H04W 8/22;
H04W 84/12; H04W 4/70; H04W 56/008;
H04W 56/0085
See application file for complete search history.

(56) References Cited

U.S. PATENT DOCUMENTS

| | | | |
|---|---|---|---|
| 2017/0294949 A1* | 10/2017 | Zhang | H04B 7/0617 |
| 2017/0367119 A1* | 12/2017 | Son | H04W 74/08 |
| 2019/0150092 A1* | 5/2019 | Mujtaba | H04W 52/0238 |

FOREIGN PATENT DOCUMENTS

| | | | |
|---|---|---|---|
| CN | 104159219 A | 11/2014 | |
| CN | 104202308 A | 12/2014 | |

\* cited by examiner

COMPATIBILITY CONFIGURATION METHOD AND SYSTEM FOR INTERNET OF THINGS DEVICE

CROSS-REFERENCE TO RELATED APPLICATIONS

This application claims priority to Chinese Patent Application No. 201510253252.X filed at the Chinese National Intellectual Property Administration on May 18, 2015, the entire contents of which are incorporated herein by reference.

TECHNICAL FIELD

The present invention relates to a technology in the field of wireless communications. Specifically, it relates to method and apparatus for intelligently configuring an Internet of Things (IoT) device, which, in 802.11n HT (High Throughput) 20 MHz bandwidth mode (HT20 mode), utilize an energy detector to verify physical lengths of configuration information packets for Wi-Fi 802.11n HT 40 MHz bandwidth mode (HT40 mode), and utilize value differences between packet lengths in HT-SIG fields of configuration information packets to transmit access configuration information. Or, method and apparatus for intelligently configuring an IoT device are provided, wherein under circumstances that an 802.11ac device does not support receiving in a higher frequency band mode, an energy detector is utilized to assist in verifying physical lengths of configuration information packets in a higher frequency band mode: 1) in VHT (Very High Throughput) 20 MHz bandwidth (VHT20) mode, receiving configuration information packets for VHT 40/80 MHz bandwidth (VHT40, VHT80) mode; 2) in VHT40 mode, receiving configuration information packets for VHT80 mode; and value differences between packet lengths in VHT-SIG-B fields of configuration information packets are utilized to transmit configuration access information.

The present invention is suitable for allowing an IoT device which only supports 802.11n HT20 mode to obtain access configuration information through Wi-Fi HT40 packets; suitable for an IoT device which only supports 802.11ac VHT20 mode to obtain access configuration information through VHT40 or VHT80 packets; suitable for allowing an IoT device which only supports 802.11ac VHT40 mode to obtain access configuration information through VHT80 packets; and suitable for allowing a Wi-Fi IoT device having frequency band limitation, receiving sensitivity limitation, multiple antenna (MIMO) limitation, and channel encoding/decoding manner limitations to obtain access configuration information through length information in physical packet headers.

BACKGROUND ART

Wi-Fi IoT access mode is one of the most widely applied IoT access modes with lowest cost and best extensibility. Usually, a Wi-Fi IoT device accesses network via a Wi-Fi access point (also called Wi-Fi hotspot or wireless router). If a Wi-Fi IoT device is to access a Wi-Fi access point, it has to obtain a name and a password of the Wi-Fi access point in a certain manner. However, a Wi-Fi IoT device usually does not have a keyboard or display. Thus, it is desired to have a simple, effective, and reliable way to transmit access information of a Wi-Fi access point to a Wi-Fi IoT device.

Existing 802.11n has two frequency range modes: HT20 and HT40. HT20 considers more about compatibility: for example, if 11b/g signals are present in an area, then in order to reduce interference to the signals as much as possible, HT20 mode has to be set, so as to reduce overlap between frequency bands. HT40 considers more about high performance: HT40 is corresponding to a bundle of two HT20 channels, one of which is a primary channel, and the other is a secondary channel. The primary channel sends beacon messages and some data messages, while the secondary channel sends other messages.

Similarly, existing 802.11ac has three frequency range modes: VHT20, VHT40, and VHT80. VHT40 is corresponding to a bundle of two VHT20 channels, while VHT80 is corresponding to a bundle of two VHT40 or four VHT20 channels.

Most Wi-Fi IoT devices have a single or limited functions, and relatively small data exchange volume, so 802.11n/ac IoT devices often only support lower frequency range modes, but do not support higher frequency range modes.

Currently available SmartLink/SmartConfig/SmartConnect technologies include: a mobile phone APP end sends UDP broadcast or multicast packets containing a name and a password of a Wi-Fi access point; a Wi-Fi IoT device may receive a sequence of the UDP packets, and as long as a form of organization of the UDP packet sequence is known, it may obtain the name and the password of the Wi-Fi access point through the received UDP packet sequence. Working principles of such an approach are that a Wi-Fi IoT device uses a Wi-Fi listening mode, parses a MAC address and a MAC layer retransmission flag in a MAC header of the received Wi-Fi communication MAC layer data packet for filtering, and based on a MAC packet length in the MAC header, derives a packet length of a UDP packet sent by the mobile phone. However, in several circumstances as described above, the Wi-Fi IoT device cannot correctly receive the Wi-Fi MAC layer data packet of the UDP packet, and cannot derive information of the data packet, such as MAC address, MAC layer retransmission flag, and MAC layer packet length.

In most circumstances, the Wi-Fi IoT device has to obtain configuration information by demodulating and parsing the whole configuration information packet. If trying to use 802.11n HT40 mode to configure an IoT device which only supports HT20, or use 802.11ac VHT80 mode to configure an IoT device which only supports 802.11ac VHT40 mode, or use 802.11ac VHT80/VHT40 mode to configure an IoT device which only supports 802.11ac VHT20 mode, then the configuration information packets cannot be demodulated. Or, if current channel condition is poor, or the receiving IoT device has MIMO limitation/channel encoding/decoding limitations, etc., causing data portions of the configuration information packets cannot be correctly demodulated, then the device consequently cannot be easily configured.

SUMMARY OF THE INVENTION

In view of the above described defects in the prior arts, the present invention proposes compatible configuration method and system for an IoT device, which transmit configuration access information through length differences between a set of configuration information packets, and detect actual durations of configuration information packets in a physical channel by a digital energy detector and a length verification controller, so as to verify length information of the resulted single configuration information packet.

A method for implementing the present invention will be described in the following, by way of example, in the context of using 802.11n HT40 mode configuration information packets to configure a device which only supports HT20 mode.

The present invention relates to a compatible configuration method for a IoT device, wherein, by adding an energy detection device and a length verification device having a timer to a digital baseband demodulation portion of a Wi-Fi wireless IoT device which only supports 802.11n HT20 mode, when the Wi-Fi wireless IoT device detects an HT-SIG field in a packet header of a configuration information packet for HT40 mode from a master configuration device, starting the timer and the energy detection device, so as to judge whether receipt is successful based on whether a recorded time length when channel energy reaches a lower limit conforms to length information in the HT-SIG field in the packet header of the configuration information packet for HT40 mode; and after successful receipt, obtaining transmitted configuration access information sections by computing length differences between received configuration information packets, then combining the received information sections to obtain configuration access information.

Said master configuration device divides an access information packet to be transmitted to the Wi-Fi IoT device into a plurality of information sections, and uses length differences between the set of configuration information packets to carry the sectioned access information packet. Since a length information section in the HT-SIG field of the Wi-Fi information packet physical header is of 16 bits, i.e., a single packet length difference may transmit an information range of 16 bits.

A length of said information section is configured to be smaller than 16 bits, and if an 8-bit unsigned number (i.e., one byte) is selected to be the length of the information section, then when N bytes are to be transmitted, N+1 configuration information packets need to be transmitted. Regarding said configuration access information, the HT20 mode Wi-Fi IoT device to be configured, after receiving a set of N+1 HT40 configuration information packets, parses the HT-SIG field in the physical packet header, the HT-SIG field being modulated with dual HT20 mode, same information for primary and secondary dual side bands, and 90 degree rotation, and then compares and verifies a length information section of the HT-SIG field with a duration length of an actual physical signal in the channel obtained by the digital energy detector and the timer; and after having received N+1 configuration information packets, combines length differences of N bytes to obtain an access information packet, i.e., the configuration access information.

Depending on scenarios of application, the length of the information section may be configured as an arbitrary length smaller than 16 bits.

Said master configuration device includes, but not limited to, a smart phone.

The present invention also relates to a system for implementing the above described method, including: a digital energy detector, a length verification controller, and a timer sequentially connected in series, wherein: an input end of the digital energy detector is connected with an output end of an A/D conversion device and receives signal energy information; the length verification controller respectively receives a signal energy falling edge from the digital energy detector and information in an HT-SIG field in a physical packet header received by the digital baseband demodulator, and outputs timing start information to the timer.

Said digital baseband demodulator includes, but not limited to, a Wi-Fi 802.11n HT20 mode digital baseband demodulator in the Wi-Fi IoT device for network access.

Technical Effects

For comparison, in the prior arts, since there may be circumstances that for access information, information sections transmitted on two continuous configuration information packets are the same, if a serial number or retransmission flag information modulated in HT40 mode in the MAC packet header cannot be parsed, it may cause retransmission confusion. The present invention does not directly use configuration information packet length information for configuration, but utilizes packet length differences, and adjusts the computation of packet length differences, thereby preventing the circumstances that continuous configuration information packets have a same length from occurring.

DETAILED DESCRIPTION OF THE EMBODIMENTS

Embodiments of the present invention will be described in detail in the following, and these embodiments are implemented according to the technical solution of the present invention, illustrative of detailed implementation and detailed operating process, but the scope of protection of the present invention does not limit to the embodiments described below.

Embodiment 1

Figure 3:
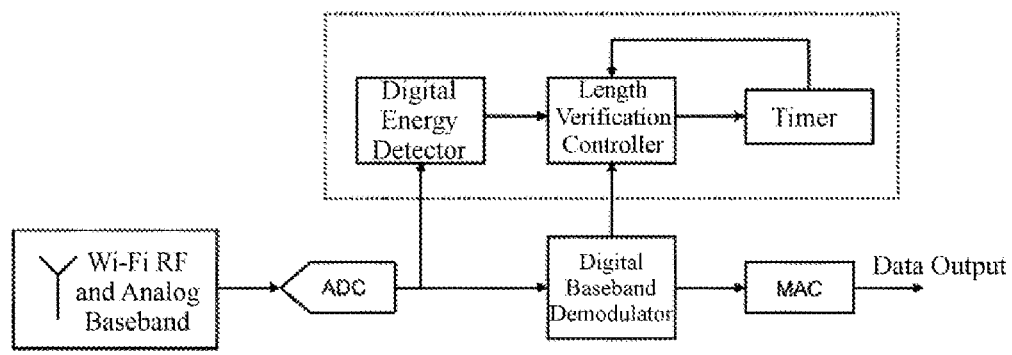
FIG. 3 is an illustrative structural diagram of a system according to the present invention.

As shown in FIG. 3, the present embodiment firstly adds a digital energy detector, a length verification controller, and a timer sequentially connected in series to a digital baseband demodulator of a Wi-Fi IoT device for network access which only supports Wi-Fi 802.11n HT20 mode, specifically: an input end of the digital energy detector is connected with an output end of an A/D conversion device and receives signal energy information; the length verification controller respectively receives a signal energy falling edge from the digital energy detector and information in an HT-SIG field in a physical packet header received by the digital baseband demodulator, and outputs timing start information to the timer.

Said digital energy detector uses a 4 microsecond sliding window to compute sampled signal energy in the window.

After said controller detects the HT-SIG field, starts the timer; and when the channel energy falling edge is detected, reads a time recorded by the timer.

Figure 2:
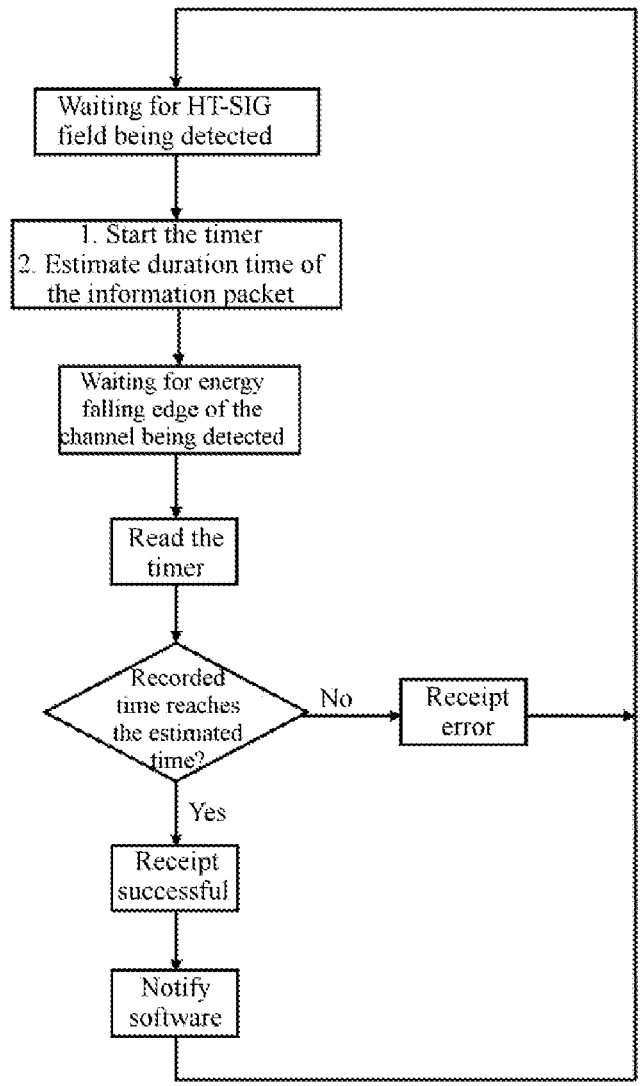
FIG. 2 is a flowchart of a length verification controller according to the present invention.

As shown in FIG. 2, the present embodiment includes the following processing steps:

1) a master configuration device which supports HT40 mode divides effective access information by a length of 8 bits (i.e., 1 byte) into a plurality of information sections, so as to obtain N information sections in total. Then the i-th information section takes a value of $D_i$, which has a value range of $D_i \in (0, 255)$, wherein $D_i$ is an 8-bit unsigned number.

The divided N data sections are carried on N length differences between N+1 configuration information packets. The first configuration information packet may be transmitted with an arbitrary packet length in a permissible packet length range.

Figure 1:
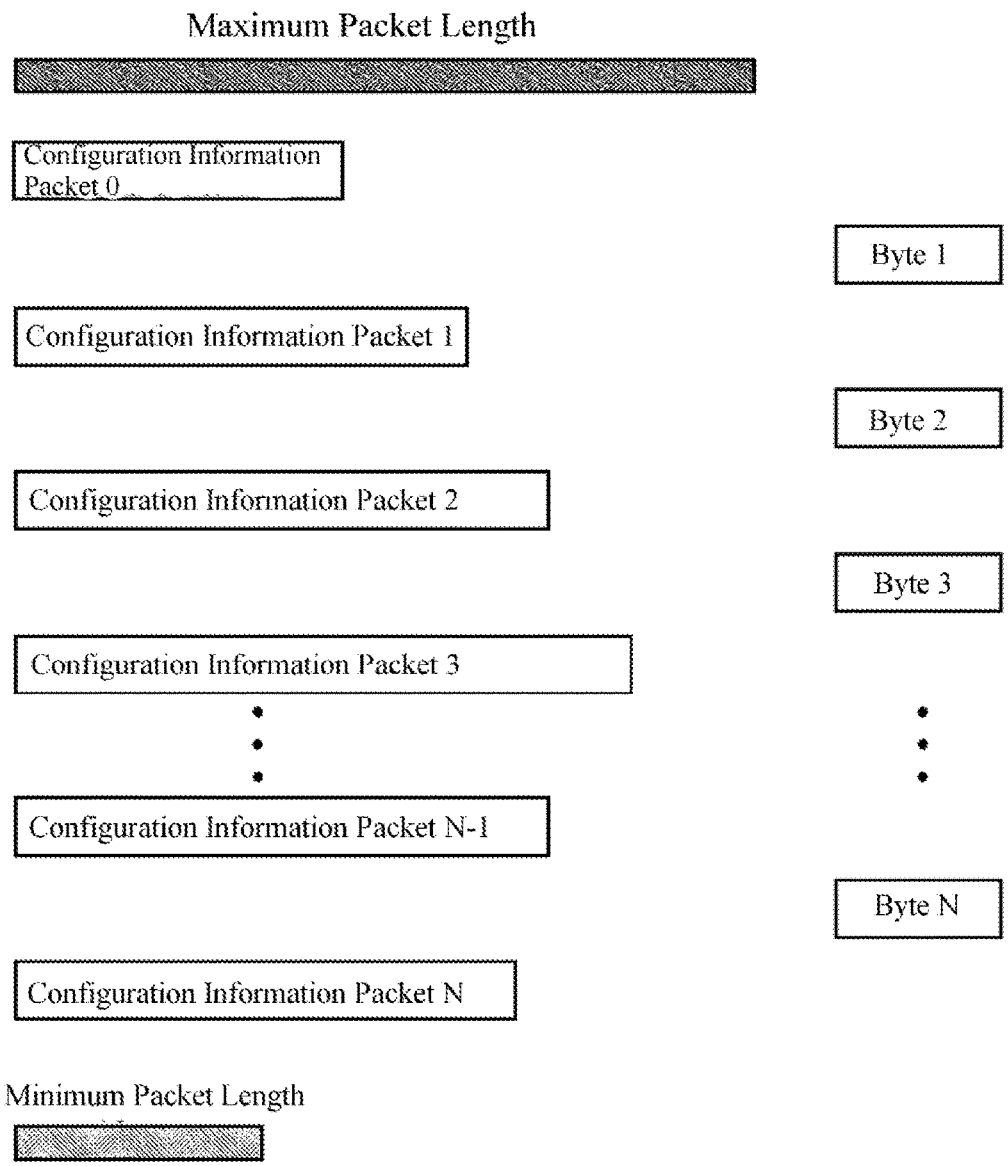
FIG. 1 is an illustrative diagram of the principles of configuration information according to the present invention.

As shown in FIG. 1, in order to avoid packets of a same length from occurring in k+1 preceding and following configuration information packets to cause retransmission confusion, the permissible packet length is in a range between a minimum packet length C to a maximum packet length C+(255+offset) k.

2) for any one of the information sections, configuration information packet length $L_i$ is computed according to the section byte value $D_i$ of the information section, specifically: the i-th configuration information packet has a maximum 16 bits packet length $L_i = [C+(\Sigma \delta_i)] \mod [(255+\text{offset})k+1]$, wherein: mod is the modulo operation; $\delta_i$ is a 9-bit unsigned number and $\delta_i = D_i + \text{offset}$, $\delta_i \in (0+\text{offset}, 255+\text{offset})$, offset is an offset value between the packet length difference $\delta_i$ and $D_i$.

Depending on specific circumstances, each configuration information packet may use different transmission modes; and data portion in the configuration information packets are random data, which is not used for the judgement.

3) the single configuration information packet is received at the Wi-Fi IoT device end to be configured:

As shown in FIG. 3, when the digital baseband demodulator of the Wi-Fi IoT device to be configured which only supports HT20 mode detects the HT-SIG field in the physical packet header of the HT packet, i.e., when the HT packet is received, starts the length verification controller, and provides the length information section in the corresponding HT-SIG field to the length verification controller.

4) according to information provided by the demodulator, the length verification controller in the Wi-Fi IoT device to be configured estimates an end time of the current packet, and starts the timer.

5) when the channel energy detector in the device to be configured detects a falling edge of signal energy in the physical channel, the length verification controller reads a content of the timer, and when a time recorded by the timer timing and the time estimated by the length verification controller fall within a preset error range, the length verification of the configuration information packet is completed, so receipt is successful; otherwise, the length verification of the configuration information packet is failed, and the controller continues to wait for the digital baseband demodulator to detect an HT-SIG field.

Said preset error range refers to: for a single configuration information packet, when an error between a duration of a signal on the actual physical channel and a time read from a physical packet header is smaller than the error range, it is judged that they conform to each other, or judged that the time read from the received physical packet header is incorrect, and at the same time, the configuration information packet will not be used for length difference computation.

6) when the device to be configured completes receipt of N+1 configuration information packets, computes a length difference between two adjacent configuration information packets, so as to obtain N length difference values, i.e., access information of N bytes, and combine all the length difference values to obtain the configuration access information.

Through the above described approach, it makes possible to configure a Wi-Fi IoT device which only supports 802.11n HT20 mode by receiving packets for HT40 mode.

Similarly, in an 802.11ac device, under circumstances when channel condition is poor and VHT higher bandwidth data transmission is not possible, similar access information transmission device utilizing packet length differences may also be applied to the configuration of 802.11ac IoT devices. In this case, an information section is carried in a difference value between packet length information in VHT-SIG-B fields of two adjacent configuration information packets.

1) an 802.11ac Wi-Fi IoT device only uses VHT20 mode to receive configuration information packets for VHT40 mode or VHT80 mode, so as to complete access information configuration.

2) an 802.11ac Wi-Fi IoT device uses VHT40 mode to receive configuration information packets for VHT80 mode, so as to complete access information configuration.

Moreover, configuration of Wi-Fi IoT devices may also be completed in the following circumstances:

1) a circumstance that a master configuration device sends data packets for multiple antenna MIMO mode, while the Wi-Fi IoT device does not support MIMO;

2) a master configuration device modulates data packets in a higher modulation mode, but channel condition is poor, and a signal-to-noise ratio at a receiving end does not support demodulation of the modulation mode;

3) a master configuration device uses LDPC (low density parity check code) channel encoding in the data portion, and the Wi-Fi IoT device does not support decoding of LDPC.

All of the above described circumstances neither influence demodulation of an HT-SIG field in a physical packet header of an 802.11n configuration information packet or a VHT-SIG-B field in a physical packet header of an 802.11ac configuration information packet, nor influence listening to and verifying a configuration packet duration length in a physical channel by the digital energy detector, the length verification controller, and the timer, so the configuration process may be smoothly completed.

The invention claimed is:

1. A compatible configuration method for an IoT device, wherein, by adding an energy detection device and a length verification device having a timer to a digital baseband demodulation portion of a Wi-Fi IoT device, when the Wi-Fi IoT device detects an HT-SIG field or VHT-SIG-B field in a header of a configuration information packet from a master device, starting the timer and the energy detection device, so as to judge whether receipt is successful based on whether a recorded time length when channel energy reaches a lower limit conforms to length information in an HT-SIG field or VHT-SIG-B field in the header of the configuration information packet for a higher frequency band mode; and after successful receipt, obtaining transmitted configuration access information sections by computing length differences between received configuration information packets from the master device, and then combining the configuration access information sections received to obtain configuration access information.

2. The method according to claim 1, wherein a length of said configuration access information section is configured to be smaller than 16 bits.

3. The method according to claim 1, wherein a length of said configuration access information section is an 8-bit unsigned number, which is one byte, corresponding to that when N bytes are to be transmitted, N+1 configuration information packets need to be transmitted.

4. The method according to claim 1, wherein for said configuration access information, when a length of the configuration access information section is an 8-bit unsigned number, after receiving a set of configuration information packets, parsing them for a HT-SIG field or VHT-SIG-B field of lower speed mode modulation, and comparing and verifying a length information section of the HT-SIG field or VHT-SIG-B field with a duration length of an actual physical signal in the channel obtained by the energy detection device and the timer, and after having received a plurality of configuration information packets, combining the configuration information packets to obtain an access information packet which is the configuration access information.

5. The method according to claim 1, wherein any one of configuration information packet length $L_i$ in said configuration access information section is computed according to a section byte value $D_i$ of the configuration access information section, specifically: for an i-th configuration information packet, a maximum 16-bit configuration information packet length $L_i=[C+(\Sigma \delta_i)] \mod[(255+\text{offset})k+1]$, wherein: mod is modulo operation; $D_i$ is a value of the i-th information section, wherein $D_i$ is an 8-bit unsigned number, with a value range of $D_i \in (0, 255)$; $\delta_i$ is a 9-bit unsigned number and $\delta_i=D_i+\text{offset}$, $\delta_i \in (0+\text{offset}, 255+\text{offset})$; and offset is packet length difference, where the offset is a value between $\delta_i$ and $D_i$; and C is a minimum packet length of the configuration information packet length $L_i$.

6. A system implementing a compatible configuration method for an IoT device, wherein the system comprises: a digital energy detector, a length verification controller, and a timer sequentially connected in series, wherein: an input end of the digital energy detector is connected with an output end of an A/D conversion device and receives signal energy information; the length verification controller respectively receives a signal energy falling edge from the digital energy detector and an HT-SIG field or VHT-SIG-B field received by a digital baseband demodulator, and outputs timing start information to the timer; wherein the system judges whether receipt is successful based on whether a recorded time length when channel energy reaches a lower limit conforms to length information in the HT-SIG field or VHT-SIG-B field in a header of a configuration information packet for a higher frequency band mode; and after successful receipt, the system obtains transmitted configuration access information sections by computing length differences between received configuration information packets from a master device, and then the system obtains configuration access information by combining the received configuration access information sections.

7. The system according to claim 6, wherein said digital energy detector uses a 4 microsecond sliding window to compute sampled signal energy in the window.

8. The system according to claim 6, wherein after said timer detects the HT-SIG field or VHT-SIG-B field, starts the timer; and when a channel energy falling edge is detected, reads a time recorded by the timer.

9. The method according to claim 2, wherein a length of said configuration access information section is an 8-bit unsigned number, which is one byte, corresponding to that when N bytes are to be transmitted, N+1 configuration information packets need to be transmitted.

10. The method according to claim 2, wherein any one of configuration information packet length $L_i$ in said configuration access information section is computed according to a section byte value $D_i$ of the configuration access information section, specifically: for an i-th configuration information packet, a maximum 16-bit configuration information packet length $L_i=[C+(\Sigma \delta_i)] \mod[(255+\text{offset})k+1]$, wherein: mod is modulo operation; $D_i$ is a value of the i-th information section, wherein $D_i$ is an 8-bit unsigned number, with a value range of $D_i \in (0, 255)$; $\delta_i$ is a 9-bit unsigned number and $\delta_i=D_i+\text{offset}$, $\delta_i \in (0+\text{offset}, 255+\text{offset})$; and offset is packet length difference, where the offset is a value between $\delta_i$ and $D_i$, and C is a minimum packet length of the configuration information packet length $L_i$.

11. The method according to claim 3, wherein any one of configuration information packet length $_{Li}$ in said configuration access information section is computed according to a section byte value $D_i$ of the configuration access information section, specifically: for an i-th configuration information packet, a maximum 16-bit configuration information packet length $L_i=[C+(\Sigma \delta_i)] \mod[(255+\text{offset})k+1]$, wherein: mod is modulo operation; $D_i$ is a value of the i-th information section, wherein $D_i$ is an 8-bit unsigned number, with a value range of $D_i \in (0, 255)$; $\delta_i$ is a 9-bit unsigned number and $\delta_i=D_i+\text{offset}$, $\delta_i \in (0+\text{offset}, 255+\text{offset})$; and offset is packet length difference, where the offset is a value between $\delta_i$ and $D_i$, and C is a minimum packet length of the configuration information packet length $L_i$.

12. The method according to claim 4, wherein any one of configuration information packet length $L_i$ in said configuration access information section is computed according to a section byte value $D_i$ of the configuration access information section, specifically: for an i-th configuration information packet, a maximum 16-bit configuration information packet length $L_i=[C+(\Sigma \delta_i)] \mod[(255+\text{offset})k+1]$, wherein: mod is modulo operation; $D_i$ is a value of the i-th information section, wherein $D_i$ is an 8-bit unsigned number, with a value range of $D_i \in (0, 255)$; $\delta_i$ is a 9-bit unsigned number and $\delta_i=D_i+\text{offset}$, $\delta_i \in (0+\text{offset}, 255+\text{offset})$; and offset is packet length difference, where the offset is a value between $\delta_i$ and $D_i$, and C is a minimum packet length of the configuration information packet length $L_i$.

13. A system implementing a compatible configuration method for an IoT, wherein the system comprises: a digital energy detector, a length verification controller, and a timer sequentially connected in series, wherein: an input end of the digital energy detector is connected with an output end of an A/D conversion device and receives signal energy information; the length verification controller respectively receives a signal energy falling edge from the digital energy detector and an HT-SIG field or VHT-SIG-B field received by a digital baseband demodulator, and outputs timing start information to the timer; wherein the system judges whether receipt is successful based on whether a recorded time length when channel energy reaches a lower limit conforms to length information in the HT-SIG field or VHT-SIG-B field in a header of a configuration information packet for a higher frequency band mode; and after successful receipt, the system obtains transmitted configuration access information sections by computing length differences between received configuration information packets from a master device, and then the system obtains configuration access information by combining the received configuration access information sections; wherein a length of said configuration access information section is configured to be smaller than 16 bits.

14. A system implementing a compatible configuration method for an IoT, wherein the system comprises: a digital energy detector, a length verification controller, and a timer sequentially connected in series, wherein: an input end of the digital energy detector is connected with an output end of an A/D conversion device and receives signal energy information; the length verification controller respectively receives a signal energy falling edge from the digital energy detector and an HT-SIG field or VHT-SIG-B field received by a digital baseband demodulator, and outputs timing start information to the timer; wherein the system judges whether receipt is successful based on whether a recorded time length when channel energy reaches a lower limit conforms to length information in the HT-SIG field or VHT-SIG-B field in a header of a configuration information packet for a higher frequency band mode; and after successful receipt, the system obtains transmitted configuration access information sections by computing length differences between received configuration information packets from a master device, and then the system obtains configuration access information by combining the received configuration access information sections; wherein a length of said configuration access information section is an 8-bit unsigned number, which is one byte, corresponding to that when N bytes are to be transmitted, N+1 configuration information packets need to be transmitted.

15. A system implementing a compatible configuration method for an IoT wherein the system comprises: a digital energy detector, a length verification controller, and a timer sequentially connected in series, wherein: an input end of the digital energy detector is connected with an output end of an A/D conversion device and receives signal energy information; the length verification controller respectively receives a signal energy falling edge from the digital energy detector and an HT-SIG field or VHT-SIG-B field received by a digital baseband demodulator, and outputs timing start information to the timer; wherein the system judges whether receipt is successful based on whether a recorded time length when channel energy reaches a lower limit conforms to length information in the HT-SIG field or VHT-SIG-B field in a header of a configuration information packet for a higher frequency band mode; and after successful receipt, the system obtains transmitted configuration access information sections by computing length differences between received configuration information packets from a master device, and then the system obtains configuration access information by combining the received configuration access information sections; wherein for said configuration access information, when a length of the configuration access information section is an 8-bit unsigned number, after receiving a set of configuration information packets, parsing them for a HT-SIG field or VHT-SIG-B field of lower speed mode modulation, and comparing and verifying a length information section of the HT-SIG field or VHT-SIG-B field with a duration length of an actual physical signal in a channel obtained by the energy detection detector and the timer, and after having received a plurality of configuration information packets, combining the configuration information packets to obtain an access information packet which is the configuration access information.

16. A system implementing a compatible configuration method for an IoT, wherein the system comprises: a digital energy detector, a length verification controller, and a timer sequentially connected in series, wherein: an input end of the digital energy detector is connected with an output end of an A/D conversion device and receives signal energy information; the length verification controller respectively receives a signal energy falling edge from the digital energy detector and an HT-SIG field or VHT-SIG-B field received by a digital baseband demodulator, and outputs timing start information to the timer; wherein the system judges whether receipt is successful based on whether a recorded time length when channel energy reaches a lower limit conforms to length information in the HT-SIG field or VHT-SIG-B field in a header of a configuration information packet for a higher frequency band mode; and after successful receipt, the system obtains transmitted configuration access information sections by computing length differences between received configuration information packets from a master device, and then the system obtains configuration access information by combining the received configuration access information sections; wherein any one of configuration information packet length $L_i$ in said configuration access information section is computed according to a section byte value $D_i$ of the configuration access information section, specifically: for an i-th configuration information packet, a maximum 16-bit configuration information packet length $L_i=[C+(\Sigma\delta_i)] \mod[(255+\text{offset})k+1]$, wherein: mod is modulo operation; $D_i$ is a value of the i-th information section, wherein $D_i$ is an 8-bit unsigned number, with a value range of $D_i\in(0, 255)$; $\delta_i$ is a 9-bit unsigned number and $\delta_i=D_i+\text{offset}$, $\delta_i\in(0+\text{offset}, 255+\text{offset})$; and offset is packet length difference, where the offset is a value between $\delta_i$ and $D_i$, and C is a minimum packet length of the configuration information packet length $L_i$.

* * * * *